Dec. 5, 1939.  W. H. WALLER  2,182,417
FLEXIBLE WHEEL DRIVING MEANS
Filed July 15, 1938  3 Sheets-Sheet 1

William H. Waller,
INVENTOR
BY Victor J. Evans & Co.
ATTORNEYS

Dec. 5, 1939.  W. H. WALLER  2,182,417
FLEXIBLE WHEEL DRIVING MEANS
Filed July 15, 1938  3 Sheets-Sheet 2
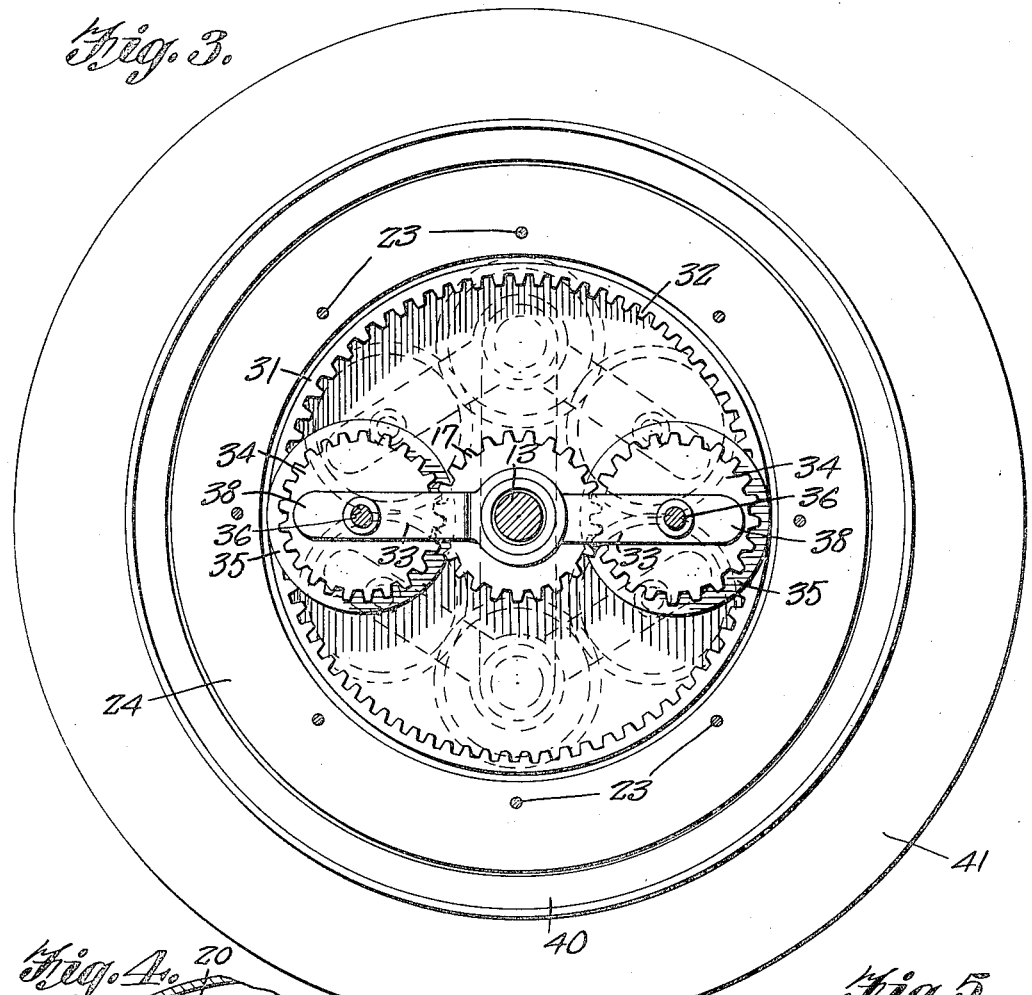
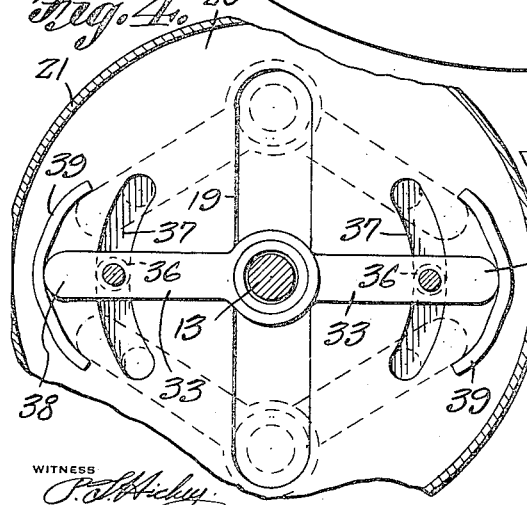
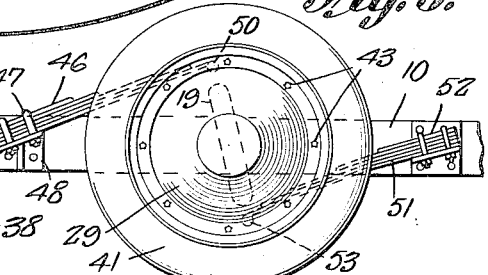
William H. Waller,
INVENTOR
BY Victor J. Evans & Co.
ATTORNEYS

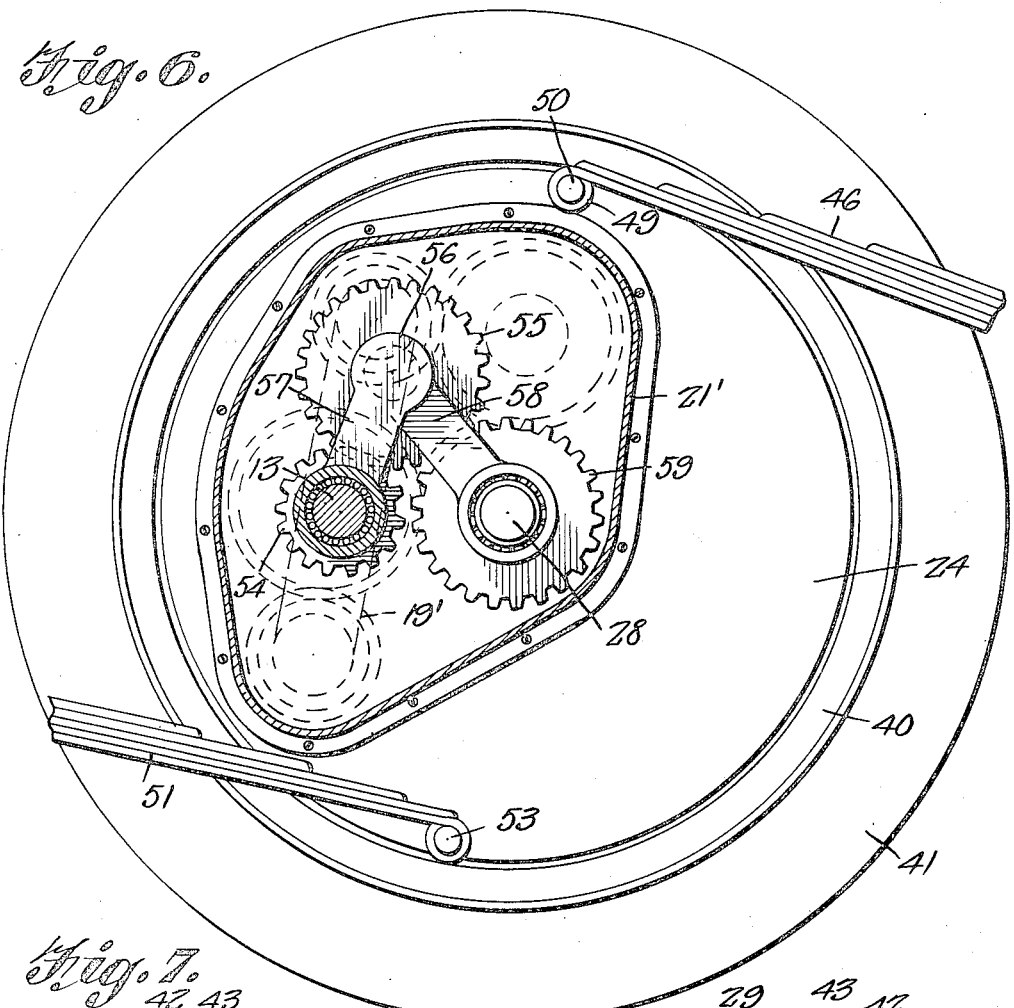
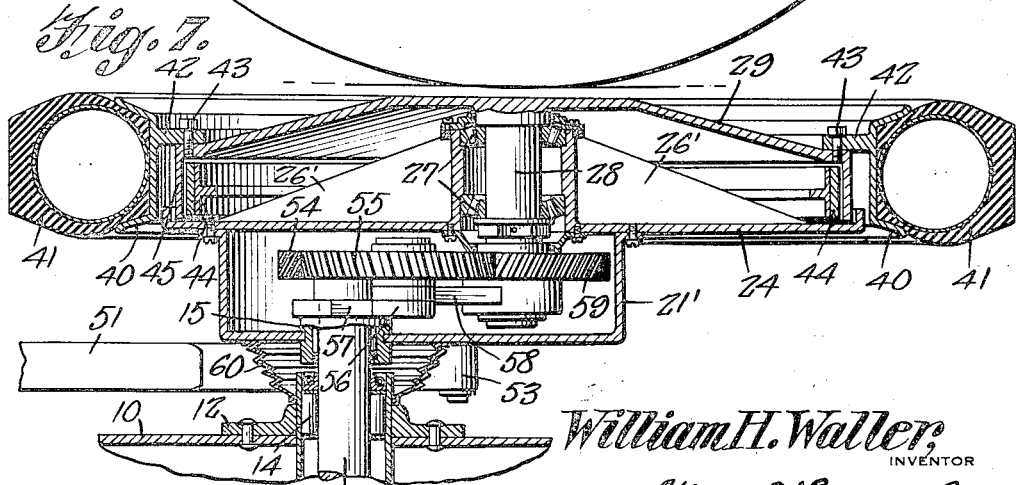

Patented Dec. 5, 1939

2,182,417

UNITED STATES PATENT OFFICE 2,182,417

FLEXIBLE WHEEL DRIVING MEANS

William Harlan Waller, Grand Prairie, Tex.

Application July 15, 1938, Serial No. 219,471

5 Claims. (Cl. 180—71)

This invention relates to flexible wheel driving means and more particularly to such means as adapted and applied to an automobile or other motor vehicle, but without absolute limitation to that particular adaptation and use.

The invention has for its principal object to secure higher efficiency in power and increased measure of safety in a full floating type of driving axle and flexible wheel mounting and connection whereby to afford easier riding qualities and at the same time minimize hazards incident to motoring.

A further object is to provide for the attachment of the axle directly to the chassis frame so as to secure a better control over and an appreciable lowering of the center of gravity in the application of the driving mechanism to the vehicle carriage frame.

With the foregoing and other important objects and advantages to be attained, as will hereinafter more fully appear, the invention consists in the general structural assembly and in the parts and combinations and arrangements of parts as hereinafter described and pointed out with particularity in the appended claims, reference being had to the accompanying drawings illustrating practical adaptations of the invention, in which Figure 1 is a partial top plan view and horizontal section showing the cooperative mounting of driving wheel end portion and one of the driven wheel assemblies;

Figure 3 is a view similar to Figure 2, but with the gear casing removed to expose the planetary gear assembly;

Figure 4 is a fragmentary view showing the planetary gear casing in section, and more or less schematically, the correlation of the driving shaft, guide slot in the gear casing and the supporting and guiding means for the gear-carrying arms of said driving shaft;

Figure 5 is a view on a reduced scale and more or less schematic in character, illustrating the spring mounting of the vehicle wheel;

Figure 6 is an inner face view of the vehicle wheel and section through the driving wheel and gear casing, illustrating a modification of the invention; and Figure 7 is a transverse section of the axle mounting and wheel assembly illustrated in Figure 6.

Figure 1:
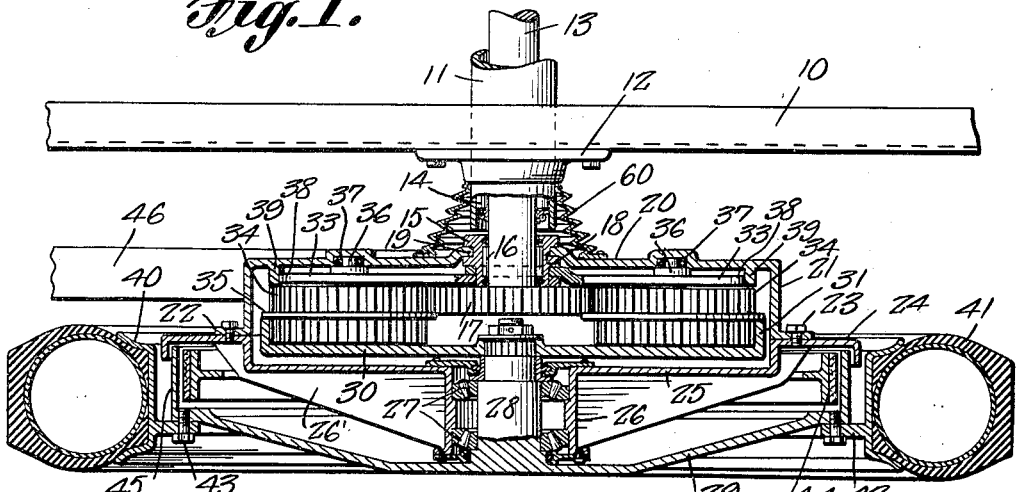
Figure 2:
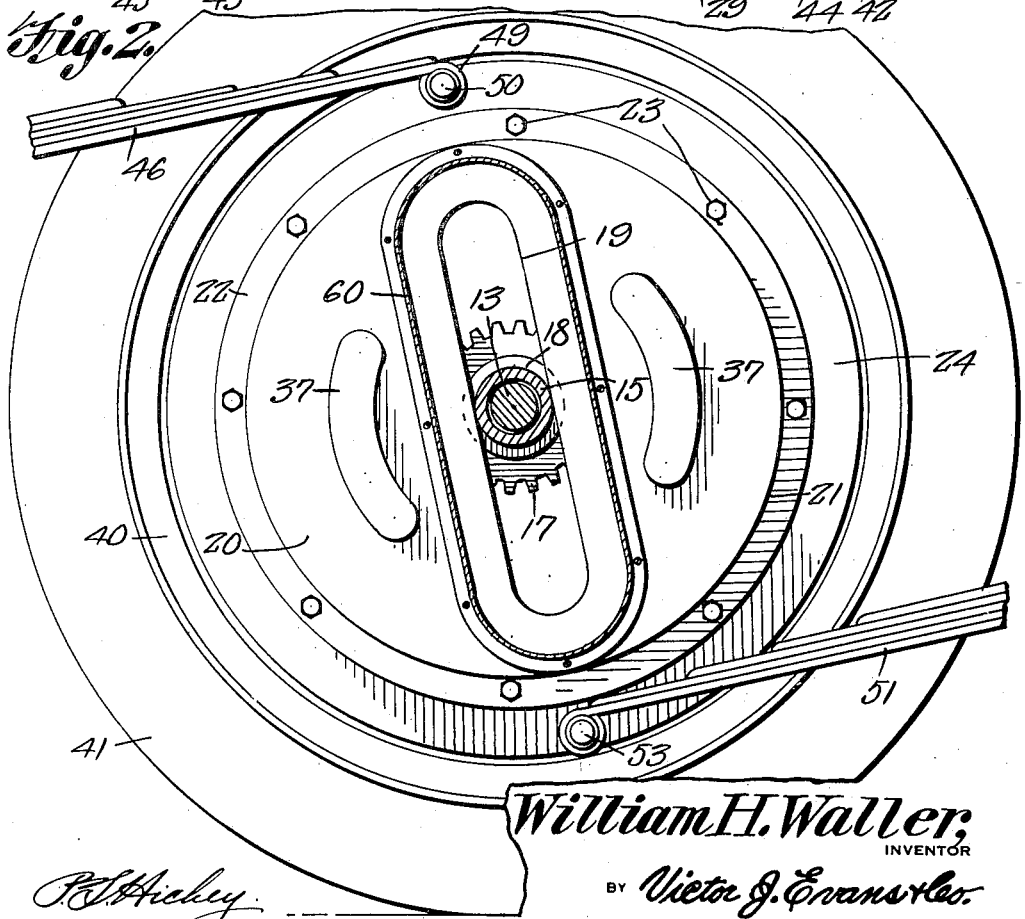
Figure 2 is a cross section through the driving wheel at a point between the end of the axle casing and the gear casing, looking towards the inner side of the mounted wheel.

Referring now to the drawings the numeral 10 designates one of the chassis frame side members on which a tubular axle casing 11 is directly mounted rigidly by means of a bracket member 12, said casing being located on top of, underneath or extended laterally through said frame member 10, according to the desired center of gravity of the vehicle. Extending through the tubular casing 11 is a driving shaft section 13, which latter is obviously driven together with an endwise opposed companion section by means of the usual propeller shaft and interposed differential gearing (not shown). As shown, the axle section 13 is journaled in a roller bearing 14 within the end portion of the tubular casing 11.

On the projected end portion of the driving axle section 13 is a guide sleeve 15 with an interposed roller bearing 16, and beyond the sleeve 15 said shaft section end portion has a gear 17 fixed thereon in any suitable manner so as to rotate therewith, said gear 17 being the driving element of a planetary gear connection between said driving shaft section 13 and the vehicle wheel, as will hereinafter more fully appear.

The sleeve member 15 is provided with an annularly grooved peripheral portion 18 which is fitted to slide in a diametrical slot 19 in the end wall plate 20 of a substantially cylindrical cupped housing member 21 which is provided with an apertured annular flange 22 surrounding its open end, said flange 22 being attached by screw bolts 23 to an annular plate portion 24 of an inner wheel-supporting disc 25 whose main body portion is depressed from the plane of the annular portion 24 and concentrically with relation to the cylindrical casing 21 so as to constitute therewith a housing for the planetary gearing to be presently described, said inner wheel support 25 having a central hollow cylindrical hub portion 26 and reinforcing ribs 26' on its face, said ribs extending from the hub to near the periphery of said support.

Within the hub portion 26 of said inner wheel support 25 is a pair of opposed roller bearings 27 which, as shown, are of the conical roller type, but, in practice, said bearings may be of any other approved roller or ball type. Journaled in said bearings 27 is a stub shaft 28 which is formed integrally or otherwise provided on an outer wheel supporting disc 29, said stub shaft extending axially from the disc and having a circular plate 30 fixedly secured on its inner end portion within the housing formed by the inner supporting plate portion 25 and the opposed casing member 21. Said plate 30 has an annular marginal flange portion 31 provided on its inner circumferential portion with a series of gear teeth 32 constituting the outer gear ring of the planetary driving gear connection between the driving shaft section 13 and said outer wheel disc 29, which will now be described.

Pivotally mounted at their inner ends on said sleeve member 15, is a diametrically opposed pair of arms 33, each of said arms having a gear 34 journaled thereon, said gears, as shown, having annular circumferential division flanges 35, and the toothed peripheral portion of each gear 34 at one side of the flange 35 being in constant mesh with said driving gear 17 on the shaft section 13, the toothed periphery of each gear 34 at the opposite side of said flange 35 being in constant mesh with said annular series of gear teeth 32 on the flanged portion 31 of said plate member 30 which is fixedly mounted on said stub shaft portion 28 of the outer wheel supporting disc 29.

In the normal relation between the driving shaft section 13 and the wheel disc stub shaft 28, the axes of said stub shaft and said driving shaft 13 substantially coincide with each other and midway between the ends of the slot 19 in said end plate portion 20 of the casing member 21, and, to whatever degree the axle section 13 is moved in either direction lengthwise of said slot 19 and correspondingly out of alignment with the axis of the stub shaft 28, the three gears 17, 32 and 34, remain respectively in mesh but in different angular relation.

In order to provide a compensating support for the ends of the arms 33 in their normal position and to guide said arms when the axle section 13 and stub shaft 28 are moved out of alignment with each other and at the same time afford a substantial bearing support for the gears 34, each of said arms is provided with a lateral extension 36 which works in an arcuate groove or depression 37 in the adjacent portion of the plate 20 of the casing member 21 with suitable anti-friction bearing means therebetween, and the end portions of said arms 33 are preferably rounded, as at 38, so as to slidably and rockably engage abutting guide shoes 39 provided on the inner face of said plate 20 in correlation to said arcuate grooved or depressed portions 37. That is to say, in the normal position of the parts, as illustrated more clearly in full lines in Figures 3 and 4, said arms 33 are in a dead central diametric relation to each other, with the lateral bearing portions 36 in the grooves or depressions 37 midway between the ends thereof, and the rounded end portions 38 of the arms abutting said shoe portions 39 also midway between the ends thereof, in which relation of the parts a substantial support is afforded the outer end portions of said arms 33 and the gears 34 carried thereby, so that, upon rotation of the driving gear 17, rotation is imparted to the outer gear ring 32 in the same or opposite direction, depending upon whether one or two flexible gears 34 are used on each arm 33 and according to which modification is used, and by virtue of said support, said gears 34 are relieved of considerable radial stress as well as being held from moving in an orbit between said inner driving gear 17 and outer ring gear 32.

Any suitable rim structure and mounting may be provided for the outer wheel disc 29. As shown, the rim is of a demountable type and comprises the usual channeled peripheral portion 40 for the reception of the pneumatic tire 41, which, too, may be of any approved form and construction. The rim shown is provided at its outer side with an internal annular flange 42 which is detachably bolted to the adjacent marginal portion of the disc 29, as at 43. In this connection, it is also noted that the wheel is provided with any approved braking means, the band portion 44 of which is conventionally shown in Figure 1 in correlation to the annular flange portion 45 provided therefor on said disc member 29.

The particular mounting of the inner wheel supporting member 25 on the chassis frame is of importance in the present invention. To this end, a rear spring unit 46 is mounted, as at 47, on a bracket 48 located on the frame side member 10, said spring unit comprising a plurality of leaves, two of which preferably extend the full length from the supporting bracket 48 to the point of attachment to the wheel member 25.

Normally, the spring extends forwardly and upwardly from said support 48 and the end portion 49 of the spring is looped or otherwise formed for pivotal attachment by means of a stud 50 or other suitable element which projects laterally from the face of the wheel support 25 and at a point slightly rearward of a vertical line through the axis of the stub shaft 28 of the wheel when the wheel is in normal position.

A similar front spring unit 51 is provided except that it extends rearwardly and downwardly from its support 52 and is attached to the wheel support 25 diagonally opposite the place of attachment of the rear spring unit, as at 53, that is to say, at a point the same distance below the axis of the wheel and forwardly from the vertical line through said axis. So, too, the longitudinal axis of the guide slot 19 in said plate portion 20 of the casing member 21 is correspondingly inclined, that is to say, it is aligned with the axes of the points of pivotal attachment 50 and 53 of said spring units 46 and 51.

By the peculiar mounting of the spring units 46 and 51 the wheel is permitted up and down movement with relation to the chassis frame member 10 but is held against lateral movement with respect to said frame member 10, and, while the springs yieldably hold the wheel in a normally neutral position and return it to such position, it is noted that, due to the inclination of the slot 19 in the gear casing 21 of the wheel support 24, the axle moves forward as it goes down into a hole and moves backward as it rides up over an obstacle, thereby minimizing shock to the chasssis and affording greater riding ease.

In Figures 6 and 7 of the drawings, a modification of the gear connection between the driving axle section and the wheel stub shaft is shown. In this modification, the driving shaft and the stub shaft are normally out of axial alignment with each other. As shown, the shaft 13 is provided with the same journal bearings 14 and guide sleeve member 15 as in the first herein described modification, and the wheel structure, in general, is practically the same in both modifications. In the present modification the shaft 13 has a gear 54 keyed or otherwise fixedly secured on its end, said gear 54 meshing with a gear 55 which is journaled on the knuckle joint 56 of a toggle support comprising an arm 57 which is pivotally mounted on the guide sleeve 15 and an opposed arm 58 which is journaled on the stub shaft 28 of the wheel supporting disc 29, said gear 55 meshing with a gear 59 which is keyed or otherwise secured on said stub shaft 28 adjacent the pivotal bearing portion of said arm 58 of the toggle. In the normal neutral positions of the respective parts the guide sleeve 15 on the driving shaft 13 is located midway between the ends of the slot in the gear casing 21, corresponding to the slot 19 of the first herein described gear casing 21 and indicated by dotted lines, at 19', in Figure 6 of the drawings.

In this second described modification, as the wheel moves up and down, supported by spring elements 46 and 51, the arrangement of which latter is identical with that of the first herein described modification, the position of the shaft 13 varies relatively lengthwise of the slot 19' toward either end thereof, and due to the mounting of the gear 55 on the toggle elements 57 and 58, it accordingly swings upwardly or downwardly with said gear 54 and remains constantly in mesh with said gear 54 and the gear 59 during such movement. In this way, a positive, though flexible, gear connection is maintained between the driving shaft 13 and the wheel stub shaft 28 whereby the latter is rotated without interruption during the up and down movement of the wheel.

By the method of mounting and driving the wheel of a vehicle in accordance with the present invention, the chassis frame can be located either above or below the axle housing so that the center of gravity of the vehicle may be determined and set for any working conditions desired. So, too, in addition to securing the advantages of the full floating axle effect as far as flexibility in the wheel mounting and easier riding qualities, the direct attachment of the axle casing to the chassis frame makes it possible to reduce the weight of many parts and even eliminate certain parts, and at the same time serves to shift the weight of the axle, differential, propeller shaft, their housings, and the springs, from unsprung to sprung weight; leaving only the wheel assembly an unsprung weight. There is a further advantage in that, by providing for a speed ratio in the gear connection between the driving shaft and the stub shaft of the wheel whereby the driving shaft rotates at a greater speed than the stub shaft, torque strain is greatly minimized so as to prevent axle breakage to an appreciable degree and it is possible to reduce the size of the differential ring gear and thus obviously effect an appreciable reduction in the size of the differential housing, thereby giving more ground clearance at this point than previously with the axles at the same relative position. It is further noted that the flexible wheel supporting and driving means of the present invention is adaptable to knee-action assemblies of the types which are either placed crosswise of the chassis or lengthwise thereof, in that the structural arrangements and provisions of the present invention are such that, with slight alteration, if any, there is ample accommodation for the transverse in and out movements relative to the chassis frame and the wheel assembly in the case of the crosswise arrangement of knee-action parts or to the arcuate movements occurring in the lengthwise knee-action assemblies.

There is still further advantage in the "flexwheel" drive in accordance with the present invention, in addition to the lowering of center gravity and other advantages herein noted, in that by directly mounting the driving axle casing on the chassis frame the need for universal joints on the propeller shaft is eliminated and it is practical to mount the motor on the rear of the chassis frame and either lengthwise or crosswise thereof and above or behind the axle. In this connection, it is also noted that it is possible with the present invention to use a substantially T-shaped chassis frame of which the driving axle casing is an integral part thereof, instead of the usual rectangular frame having the longitudinal side rails. It is further noted that the differential need not, of necessity, be placed midway between the wheels, as past methods require, but can be placed near either wheel when so desired.

The flexible wheel driving principle of the present invention is readily adaptable to front wheel driving by the insertion of a universal joint centered on a common center line with an upper and lower kingpin, and between them. In this connection, it is noted that the stub shaft can be made any desired diameter to prevent breakage at this point. It is further obvious that the driving mechanism of the present invention allows and provides a means by which the driving wheels of a vehicle can be mounted individually and free of each other, a desirable condition which has not been perfected heretofore, but which is fast becoming common practice in front wheel mounting.

While the several working parts, including the bearings as well as the gear elements, et cetera, are housed within the axle casing and wheel supports and obviously provided with local lubricant retaining and dust guard means, it is preferable to provide a special flexible covering, as at 60, between the end of the axle casing 11 and the adjacent portion of the gear case 21, said covering 60 being of sufficient extent and suitably accordion-pleated to permit of the free up and down movement of the wheel support relative to the end of the axle casing.

Obviously, the structure admits of considerable modification within the spirit and scope of the invention as defined by the appended claims. The invention, therefore, is not limited to the specific construction and arrangements shown in the accompanying drawings.

What is claimed is:

1. Flexible wheel driving means for automobiles and the like, including in combination with a chassis frame, an inner wheel support resiliently mounted on the chassis frame for relative up and down movement, said wheel support having a gear casing at its inner side and a hub extension at its outer side, an outer wheel support having an axial stub shaft at its inner side journaled in the hub portion of said inner wheel support and extending into said gear casing, a gear on said stub shaft, a driving axle mounted directly on said chassis frame, the end portion of said driving axle being extended from the chassis frame and into the gear casing of said inner wheel support through an elongated slot provided therefor in the end wall of said casing, a gear on said driving axle in opposed relation to said gear on the stub shaft of the outer wheel support, and a transmission gear interposed between said two other mentioned gears in constant meshing relation therewith, said transmission gear being movably supported with relation to said other two gears.

2. Flexible wheel driving means for automobiles and the like, including in combination with a chassis frame, an inner wheel support resiliently mounted on the chassis frame for relative up and down movement, said wheel support having a gear housing at its inner side and provided with a diametrical slot in the end wall of said housing, said support having an axial hub portion at its outer side, an outer wheel support having an axial stub shaft at its inner side journaled in the hub portion of said inner wheel support and extending into said gear housing, a ring gear mounted on the inner end of said stub shaft of the outer wheel support to rotate therewith in the gear housing of said inner wheel support, a driving axle journaled directly on the chassis frame, said driving axle having its end portion extended into the gear housing of said inner wheel support through the diametrical slot in the end wall of said casing, said driving axle having a bearing and guiding collar thereon slidably engaging the slotted wall portion of said gear housing, a gear mounted on the end of said driving axle to rotate therewith within said housing, oppositely disposed supporting arms pivotally mounted on said bearing and guiding collar of the driving axle, means on said gear housing for movably supporting and guiding said supporting arms in correlation to the pivotal support provided for said arms on said bearing and guiding collar of said driving axle, and transmission gears on said supporting arms interposed between and in meshing engagement with said gear on said driving axle and the ring gear on said stub shaft of the outer wheel support.

3. Flexible axle driving means for automobiles and the like, including in combination with a chassis frame, an inner wheel support resiliently mounted on the chassis frame for relative up and down movement, said support having a gear housing at its inner side and provided with an elongated slot in the end wall of said housing, said support having an axial hub portion at its outer side, an outer wheel support having an axial stub shaft at its inner side journaled in the hub portion of said inner wheel support, a gear mounted on said stub shaft to rotate therewith in said housing, a driving axle journaled directly on said chassis frame, the end portion of said driving axle being projected into said gear housing of the inner wheel support through said elongated slot in the end wall thereof, said driving axle having a bearing and guiding sleeve thereon slidably engaging the adjacent slotted wall portions of the gear housing, a gear fixed on said driving axle to rotate therewith in said housing, a toggle support including a member journaled on said bearing and guiding sleeve of the driving axle and a companion member journaled on said stub shaft of the outer wheel support, and a transmission gear journaled on said toggle support axially coincident with the pivotal axis of the knuckle joint of said toggle support, said transmission gear being constantly in mesh with said gear on the driving axle and said gear on the stub shaft of the outer wheel support.

4. In a flexible driving wheel mounting for automobiles and the like, a driving axle journaled directly on the chassis frame, an inner wheel support, an outer wheel support having an axial stub shaft journaled axially on said inner support and carrying the wheel rim and tire, said inner support having a gear casing provided with an inclined elongated slot in its end wall, the angle of inclination of said slot being approximately near a vertical plane, and the longitudinal axis of said slot extending equally above and below a given center, said center normally coinciding with the axis of said driving axle, the end portion of said driving axle extending through said slot whereby said inner wheel support is guided on said axle in relative up and down movement, a compensating driving gear connection between said driving axle and said stub shaft of the outer wheel support, and a pair of opposed spring elements on said chassis frame for resiliently supporting said inner wheel support, one of said spring elements extending rearwardly and downwardly from a solid support on said chassis frame and pivotally attached at its inner end to said wheel support adjacent the lower end of said slot of the inner support and coinciding with the longitudinal axis of said slot, the other spring element extending forwardly and upwardly from a solid support on said chassis frame and pivotally attached at its outer end to said wheel support adjacent the upper end of said inclined slot and coinciding with the longitudinal axis of said slot.

5. A flexible wheel carrying and driving means including, in combination, a body to be carried and propelled, a driving axle rigidly mounted directly on said body, a floating inner wheel support comprising a generally flat circular body member provided on its outer side with a central hub extension having an axial opening therethrough, a housing on the inner side of said body member provided with a slot in the wall thereof through which the end of the driving axle is received in the housing and whereby the housing is guided in movement transversely of the axle in the line of the longitudinal axis of the slot and rotatably about the axis of the axle, spring means connecting the carried body and said inner wheel support whereby the support is resiliently maintained in a neutral position relative to the driving axle and with the slot of the housing of the inner wheel support disposed with its longitudinal axis substantially vertical, an outer wheel support comprising a circular body in cooperatively opposed relation to the body portion of said inner wheel support, an axial stub shaft on the inner side of said outer wheel support body journaled in the hub portion of the inner wheel support body and projected into the housing of the latter, and compensating driving means connecting the ends of the driving axle and stub shaft within said housing.

WILLIAM HARLAN WALLER.